Dec. 13, 1932.  A. H. SQUIER  1,890,957
ANTISKID DEVICE
Filed Dec. 6, 1930   2 Sheets-Sheet 1
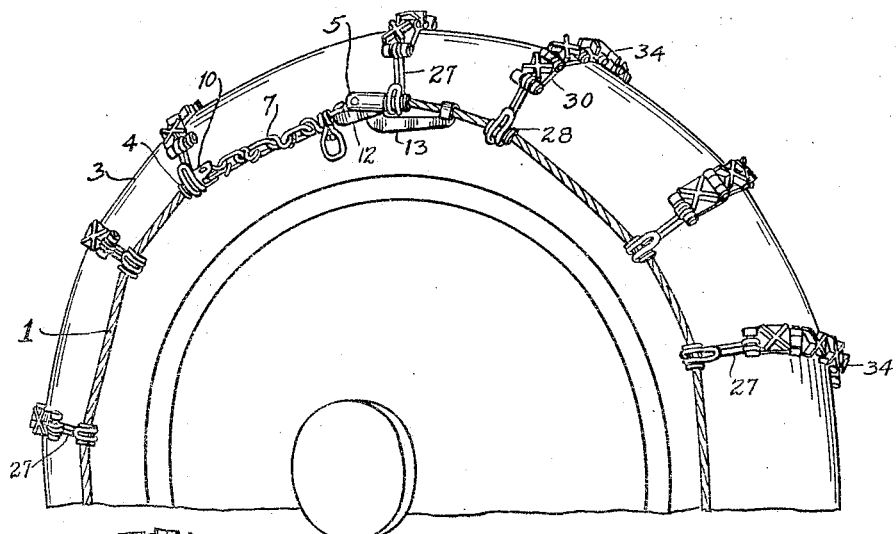
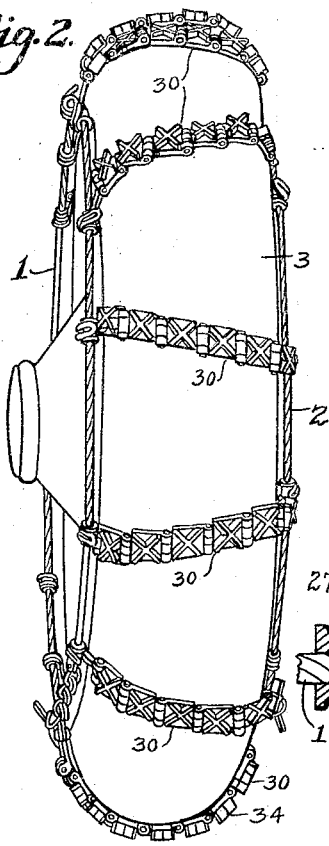
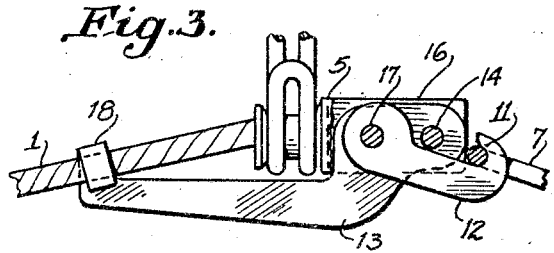
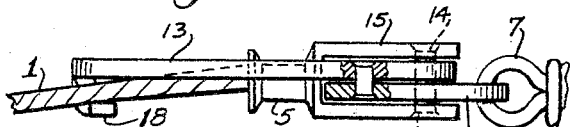
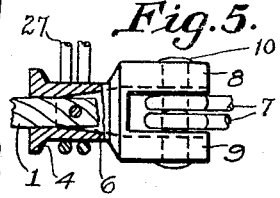
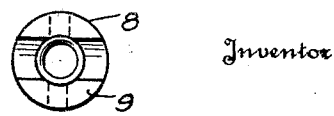
Inventor
Arthur H. Squier
By Mason Fenwick Lawrence
Attorneys

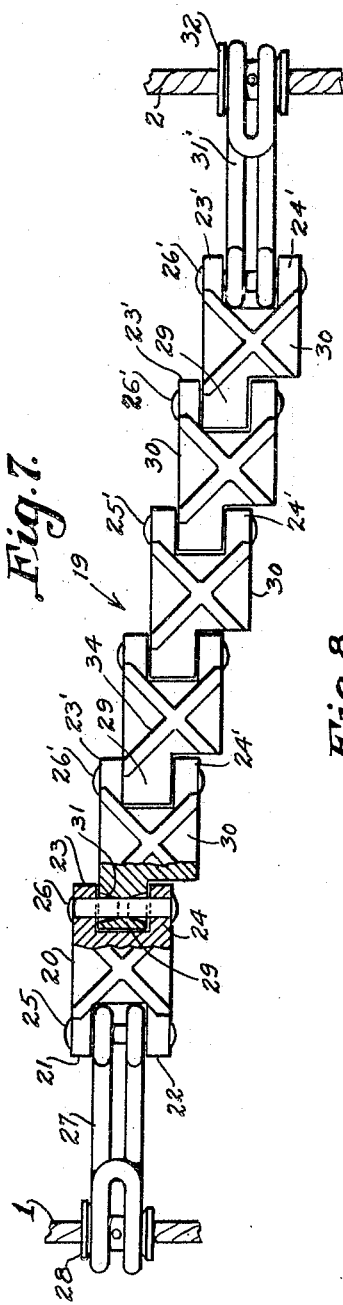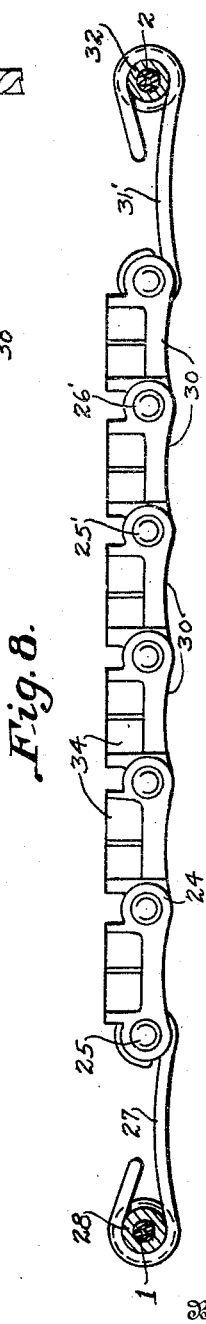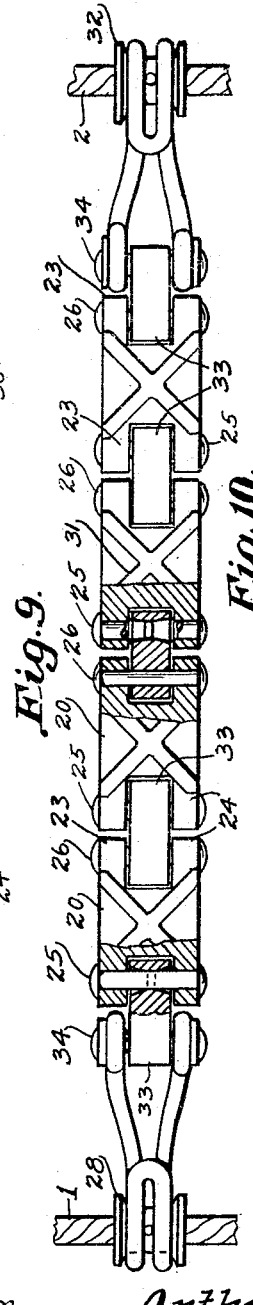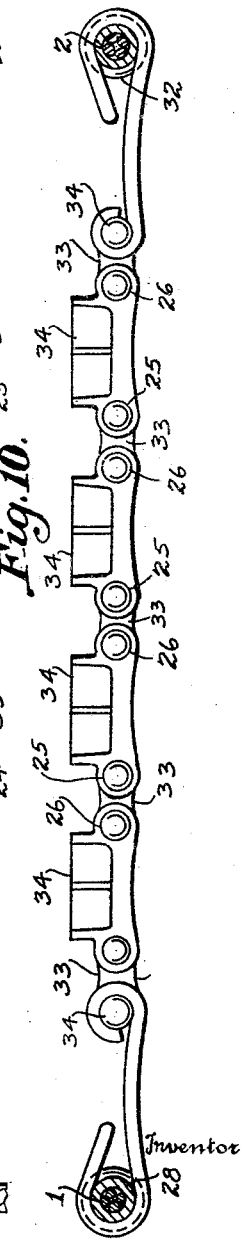

Patented Dec. 13, 1932

1,890,957

UNITED STATES PATENT OFFICE

ARTHUR HYNSON SQUIER, OF RENO, PENNSYLVANIA

ANTISKID DEVICE

Application filed December 6, 1930. Serial No. 500,633.

This application is a continuation in part of my application Serial No. 448,720 filed April 30, 1930 for anti-skid devices.

The invention forming the subject matter of this application is a tire chain designed particularly to be applied to the tires of automobiles and other vehicles to prevent skidding of the wheels of such vehicles on slippery surfaces.

The main object of the present invention is to provide a chain of this character on which the cross links are made of wear plates so constructed and arranged that their opposite ends of each link are connected to points on the peripheral cables laterally displaced with respect to a plane perpendicular to the plane of the central circle of contact of the tires with the road.

This lateral relative displacement of the ends of the link produces a sort of diagonal arrangement of the links across the periphery of the tires, and thereby avoids the formation of swing loops which hammer the roadway and produce undue wear and unnecessary noise.

Where the links of the ordinary tire chain extend directly and perpendicularly across the tire, the centrifugal force of the revolving tire causes the links to swing out from the tire in a somewhat free loop which hammers the pavement noisily and results in undue wear of both link and pavement. It will readily be appreciated that if it were possible to string the links in the form of circles around the tire and concentric with the axis of the tire, the hammering action of the links would be eliminated, since the circular links would be in rolling contact with the pavement. The present diagonal arrangement of cross links is a compromise between the usual form of transverse link and the ideal circular rolling contact link, and in actual practice has been found the noisy hammering inherent in the usual type of cross link is eliminated. It will be readily apparent from Figure 2 of the drawings herein that the side plates of the cross links contact with the pavement in advance of the center plates so that the contact of all the plates is really a rolling contact.

Another object of the invention is to provide an improved toggle lock for the peripheral cables of the chains, in order to insure the links being held tightly against the tires and thereby to achieve the desired silent rolling contact of the links with the pavement.

Another object of the invention is to provide a chain in which the alternate cross links only are arranged parallel to each other and in which each link is inclined with respect to the adjacent links on either side, thereby insuring contact at all times of at least one of the cross links with the pavement.

Other objects of the invention will become apparent as the detailed description thereof proceeds.

In the drawings,

Figure 1 is a fragmentary side elevation of an automobile tire equipped with a chain constructed according to the present invention;

Figure 2 is an end elevation thereof;

Figure 3 is a fragmentary side elevation of a toggle lock for securing the ends of the peripheral cables to each other;

Figure 4 is a plan of the lock shown in Figure 3;

Figure 5 is a side elevation of a cable terminal designed to receive the end link of a short length of chain used to provide for adjustment of the peripheral cables.

Figure 6 is an end elevation of the terminal shown in Figure 5;

Figure 7 is a plan of my preferred form of cross link;

Figure 8 is a side elevation of the cross link shown in Figure 7;

Figure 9 is a plan view of a modification of the invention illustrating a cross link built up of plates similar to one of the end plates of the link shown in Figure 7, and Figure 10 is a side elevation of the link shown in Figure 9.

The tire chain comprises a pair of cables 1 and 2 adapted to be arranged on the opposite side walls of a tire 3, and having their ends suitably secured to terminals 4 and 5. The terminal 4 (see Figures 5 and 6) is provided with a central countersunk bore 6 in which one end of the cable is spread, soldered and pinned or riveted. The terminal 4 is bifurcated and a chain 7 has one of its end links inserted between the furcations 8 and 9 to be fastened therein by a rivet or pin 10.

The chain 7 swings freely from the pin 10 and is adapted to have any of its links caught up by the hook 11 at one end of a short toggle link 12 which has its other end pivoted to the intermediate part of a locking link 13. The terminal 5 is bifurcated to receive the pivoted ends of both toggle and locking links. One end of the locking link 13 only is pivoted by means of the pivot pin or rivet 14 which extends across and through the furcations 15 and 16 of the terminal 5.

One end of the toggle link 12 is pivoted to the link 13 by means of the rivet or pin 17 and the link 13 is extended to provide a comparatively long lever arm which terminates in a hook 18 adapted to be sprung over and engage the cable 1 or 2, as the case may be. As will be apparent from Figure 1 the chain 7 and this toggle lock mechanism provides a means by which the cables may be adjusted to adapt them for use on tires of different sizes and to lighten the cables properly on the tires to which the chain may be applied.

Either form of the cross links shown in Figures 7 and 9 may be used. The essential thing is that they be angularly arranged across the tire in a series of blunt apexed triangles and with the narrow and broad bases thereof alternating along each of the peripheral cables. If all the cross links were parallel to each other, and initially diagonally arranged on the tire, it is obvious that the cables would creep around the tire until the cross links extended directly across the tire in loose loops which would produce the undesirable hammering above referred to. By arranging the links as shown in the drawings, all tendency of the cables to creep is eliminated and the links remain in the positions in which they may be originally mounted on the tire.

The cross link 19 comprises an end plate 20 having its opposite ends bifurcated to form perforated pairs of ears 21, 22, 23 and 24 adapted to receive pivot pins or rivets 25 and 26, respectively.

The pin 25 secures one end of a link 27 to the end plate 20; and the other end of link 27 is pivotally hooked around a sleeve or bobbin 28 which is suitably secured to the cable 1. The other pin 26 passes through an apertured lug 29 of an intermediate plate 30; and this lug 29 extends from one side of one end of plate 30.

The lug 29 has slight play between the furcations 23 and 24, and the aperture 31 therein is counterbored in opposite directions so that the center of the aperture forms a rocking bearing for the pin 26. The other plates of the link are similar to plate 30, and each of them has its end opposite to lug 29 bifurcated to form lugs 23' and 24', similar in every respect to the lugs 23 and 24, and adapted to receive the lug 29 of the next succeeding plate 30.

A suitable number (depending upon the width of the tire) of these plates 30 are pivoted to each other and to the plate 20, in the manner shown in Figure 7; and a link 31', similar to link 27 is pivoted at one end to a pin 26 of the end plate 30, and has its other end pivotally hooked over a sleeve or bobbin 32 suitably secured to cable 2.

By the construction illustrated in Figure 7, the link as a whole extends naturally diagonally across the tire 1, but the individual anti-skid plates 20 and 30 extend perpendicularly across the tire. This, of course, is due to the peculiar construction of the link plates and their connection to each other.

In the form of the invention illustrated in Figures 9 and 10, the plates are similar to the plate 20 shown in Figure 7, and the parts thereof are similarly designated. However, the plates 20 are connected pivotally to each other by a separate link 33 suitably bored and counterbored at each end to receive pivot pins 25 and 26 respectively. Each of these links 33 has slight play between the ears of the plates 20 and the counterbored apertures permit the link to rock slightly on their pivot pins 25 and 26.

The opposite ends of this modified link may be connected directly to the pivot pins as shown in Figure 7; or may have their inner ends spread apart, as shown in Figure 9, to receive pivot pins 34 extending through the free ends of the opposite end links 33.

The form of the invention shown in Figure 7 will retain its original diagonal arrangement on the tire 1, because of its peculiar construction, even though the links be arranged parallel to each other. With the form shown in Figure 9 it is necessary to arrange them triangular fashion as shown in Figures 1 and 2 in order to prevent the creeping of the cables on the tire until the links lie directly across the tire.

Any desired form of anti-skid projection may be used on the plates 20 and 30, but I prefer to use the X-shaped projections 34 in which the outer ends of the projections are free of obstruction, and in which such projections have substantially the same cross section throughout their depth. By this construction, the projections retain their non-skid properties until they become worn practically level with the upper face of the plates 20 or 30. This non-skid construction of the cross link plates is disclosed and claimed in my copending application above referred to.

There is a new and basic principle involved in this invention which is brought about by connecting the spike plate link cross sections or chains diagonally over the tire to each side cable or side chain and reversing the diagonal direction of each alternate cross section or cross chain, thus forming a series of triangles reversed consecutively around the tire. The tightening hooks with their link connections making the last of an even number of triangles so formed and held tightly in position by the new tightening hook and lever; all of which are plainly shown in the drawings herewith attached and specifically made a part of this petition for Letters Patent.

The principle or basic principle is now apparent, for when the tire upon which the anti-skid devices, as described, have been properly placed with the cross-chains diagonally spaced in triangles, the whole cross-chain will lie tight to the tire by reason of their connecting ends being fastened to side-cable or side-chain not directly opposite each other. Therefore no loop swing is possible in the cross-chains when the tire is revolving and centrifugal force increasing directly as the speed increases; on the contrary, if the cross-sections or cross-chain were connected to the side-cable or side-chains straight over the tire, a swing loop would be formed in the cross-section as the car is speeded up, thus making the cross-sections and chains hammer the pavement with undue wear and noise as at present. This is all done away with by placing my spike plate links as cross-chains in a series of reversed triangles properly spaced and tightened to the tire. This has been thoroughly proven by long and severe test on the concrete pavement.

It is now apparent that smooth running with chains has been made possible by this triangular construction of my spike plate links and cross-chains; the blunt apex of each triangle insures continuous contact of the spike plate link cross-chains with the pavement, and prevents skidding, thus insuring safety at all times on ice or slippery pavement.

The links are connected by a hinge construction, with alternate male and female ends, with the male end counter-bored on both sides of hole, thus providing for flexibility and making a rocker of each connection when the rivet is placed.

The drawings show the spike plate link connections in two designs; one design with female connection ears at each end and a separate connecting link drilled and counterbored at each end as the male connection; when this design is used it is connected diagonally across the tire and the plates are in angular position as well. This is not so with construction where ends all are male and female excepting one link. The male end of the plate is designed to form an angular cross-section by joining the corner which has been drilled and counterbored in a rocker manner as described with the female end of the next link plate as shown in drawings herewith attached. The same triangular construction is made possible and cost of manufacture very materially reduced and road tests have proven it fully if not more durable than the other; both of which have had actual road test on the pavement 250 miles and still intact.

The new tightener is constructed in a manner to give the tightening lever enough leverage to permit the hook to reach from hook to the next link and tighten with the thumb and finger as shown in drawings. The hook when tightened locks the link inside by the closeness of point of hook to lever tightening.

What I claim is:

1. An anti-skid cross link comprising a plate, having bifurcated ends provided with registering apertures, a plate having an apertured lug projecting from one end thereof and laterally displaced with respect to the center of said plate, and means for pivoting said lug to the furcations of said bifurcated end.

2. An anti-skid device comprising a rectangular base plate, having its opposite ends bifurcated and a series of anti-skid plates pivoted to each other and laterally offset with respect to adjacent plates.

3. A cross link for an anti-skid chain comprising a plurality of rectangular plates each of which is provided at one end with a pair of apertured ears and each of which is provided with an apertured lug adapted to seat between the apertured ears of the adjacent plates, the aperture in each lug being counterbored in opposite directions, and a pivot pin extending through the apertured ears and lug to provide a rocking support for one plate on the other.

In testimony whereof I affix my signature.

ARTHUR HYNSON SQUIER.